Patented July 17, 1923.

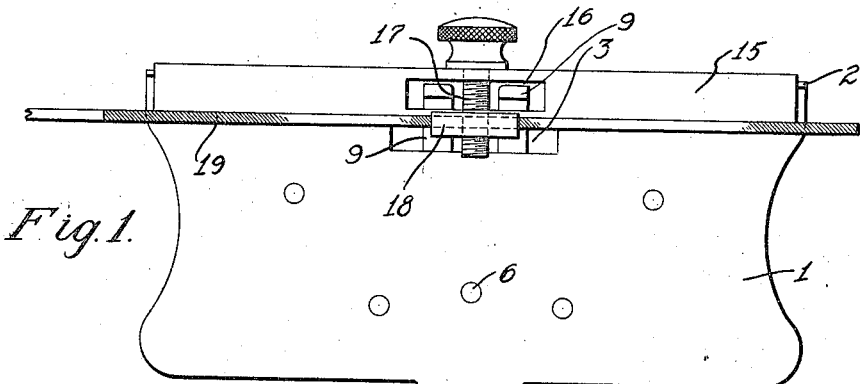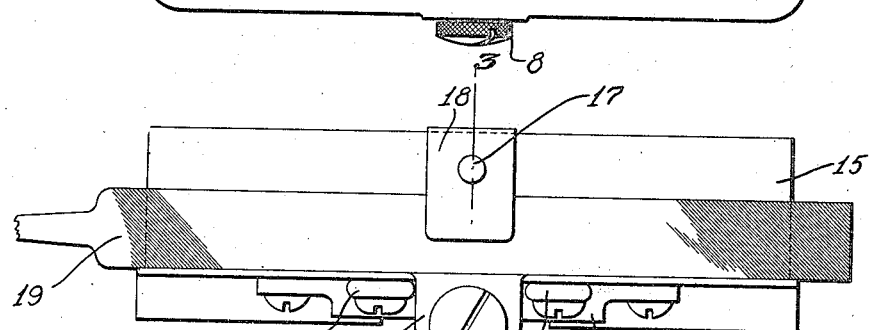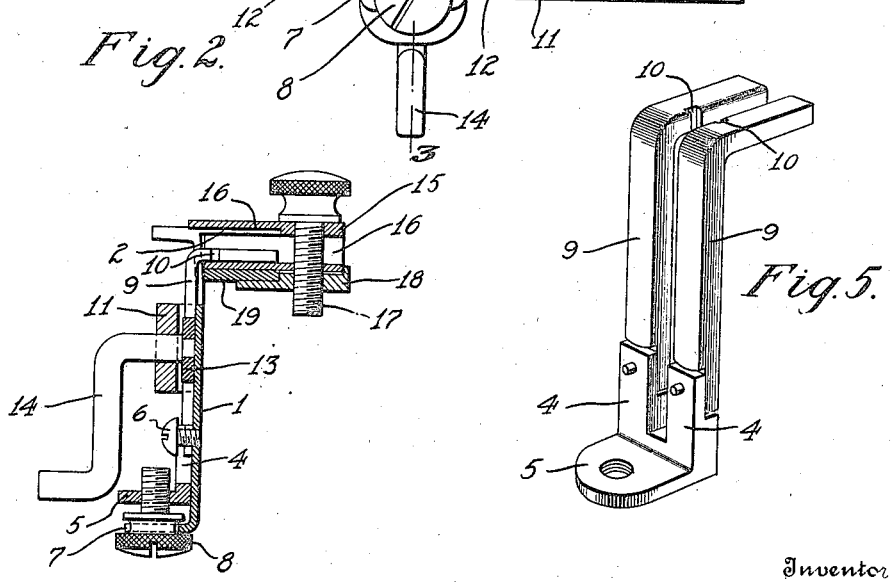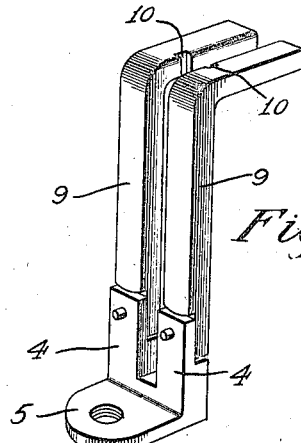

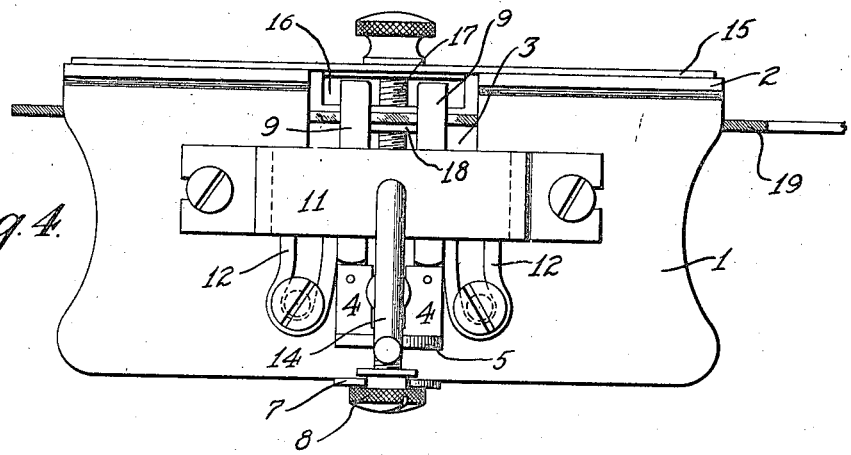
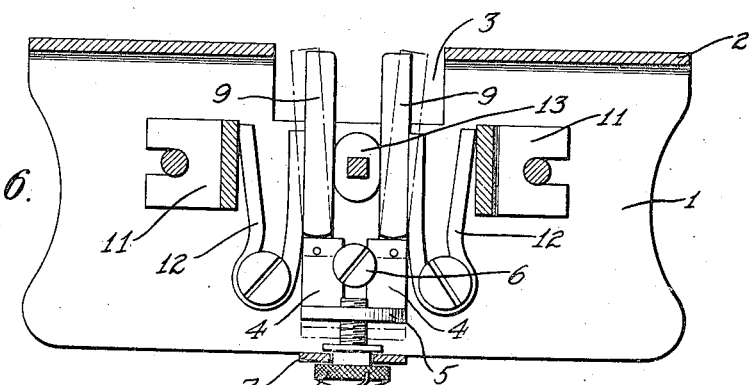
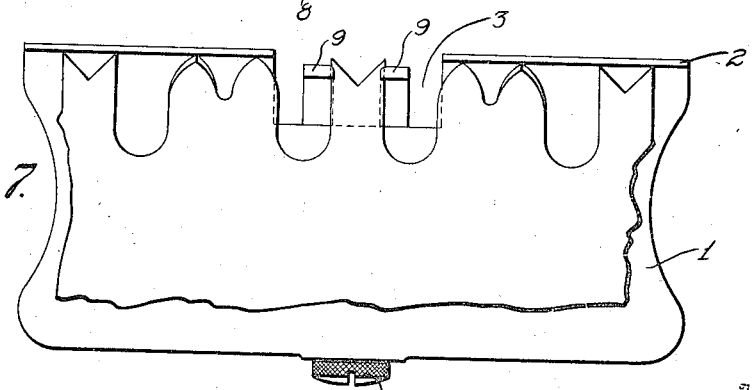

1,462,325

UNITED STATES PATENT OFFICE.

MICHAEL DALLENBACH, OF RIDGWAY, PENNSYLVANIA.

SAW-TOOTH DRESSER, JOINTER, AND GAUGE.

Application filed December 22, 1921. Serial No. 524,157.

*To all whom it may concern:*

Be it known that I, MICHAEL DALLENBACH, a citizen of the United States, residing at Ridgway, in the county of Elk and State of Pennsylvania, have invented certain new and useful Improvements in Saw-Tooth Dressers, Jointers, and Gauges, of which the following is a specification, reference being had therein to the accompanying drawing.

This invention comprises a combined saw tooth dresser, jointer and gauge. It is a continuation of and a development and simplification of the structure shown in my prior Patent No. 1,019,429, granted March 5, 1912.

It is contemplated as an object of the invention to provide a device of this character which will be adaptable to so-called raker teeth of various sizes, the gauge portion of the apparatus being provided with means for quickly and accurately changing its scope to conform to the different sizes with which it may be used.

Another object is to provide a dressing member which may be detached from the device and applied to it quickly and easily and which will, when applied, be accurately and positively placed in relation to the other parts.

Another object is to minimize the number of working parts and arrange them so as to be readily accessible and in such a manner that they will give accuracy and true positioning to the parts when used in connection with saw tooth setting, dressing, jointing and the like.

Other objects and advantages will in part be apparent and in part be brought out more fully in the description which follows:

Drawings illustrating an embodiment of the invention are hereto annexed, the following views being shown:

Figure 1 is a view in front elevation of a device embodying my invention;

Fig. 2 is a view in bottom plan of the same;

Fig. 3 is a view in vertical section on the line 3—3 of Fig. 2;

Fig. 4 is a view in rear elevation of the device shown in Fig. 1;

Fig. 5 is a view in perspective of gauge arms and their mounting;

Fig. 6 is a detail view, partly in section, of the working parts of the device shown in Fig. 4; and Fig. 7 is a view in elevation showing the application of the device to gauge a raker tooth.

In these drawings, the reference-character 1 designates a base-plate having a smooth flat inner surface adapted to engage a corresponding surface of a saw and form a bearing therewith. Arranged at what is preferably a true right angle with the inner surface of this plate there is an inwardly extending stop-plate 2. The base-plate is shaped at its ends to constitute a good gripping hold for the hand and both the base-plate and stop-plate are, intermediate their ends, provided with an open or cut out portion 3.

Upon the back of the base-plate there is mounted a gauge-arm bearing comprising spaced-apart arms 4 and an angularly extending threaded lip 5. The back of this bearing is adapted to contact the surface of the base-plate and be held in sliding engagement therewith suitably, as by a screw 6 placed between the arms 4. The screw fits the space between the arms closely so as to prevent any side play, and means are provided for moving the bearing in a stright line, toward and away from an edge of the base-plate which is provided with the opening 3.

As here shown, such means include an angular lip 7 disposed on the base-plate and extending rearwardly therefrom. This lip is bifurcated and embraces the neck of an adjusting screw 8 having a screw threaded into the threaded opening of the lip 5.

Pivotally secured at one end of the arms 4 of the bearing member and adapted to have a swinging movement thereon are two gauge-arms 9. These are bent at their outer ends to approximately right angles to the arms and into a plane parallel to the plane of the under surface of the stop-plate 2. They are also provided with notches 10 on their inner opposed faces, these notches being in line with the inner face of the base-plate so that they will embrace a saw tooth when positioned therein as shown in Fig. 7.

Means are provided for maintaining the arms in close contact with a tooth for gaging and for spreading them apart. As here shown such means comprise a housing or confining plate 11, detachably secured to the back of the plate 1 as by screws and having shoulders between which and the arms are placed spring members 12 suitably secured to the back of the plate as by screws. The tendency of these spring members is to force the arms inwardly toward each other and this is restricted by a cam member 13 pivoted to the base-plate in vertical alinement with the centre of the screw 6 and provided with an operating arm 14 passing through an opening in the plate 11. Movement of this arm actuates the cam to spread the arms 9, as shown in dotted lines in Fig. 6. The construction just described permits an adjustment of the outer surface of the bent portion of the gauge-arms with relation to the under surface of the stop-plate; it also adjusts the sweep or extent of opening of the arms by changing the pivot point of the arms with relation to the face of the cam. The nearer the pivot point of the gauge-arms to the cam, the wider will be the spread of the outer ends of these arms. This permits adjustment to teeth of different widths and height.

Associated with the parts just described, there is a dressing instrumentality comprising a member 15, provided with a slot 16 for the reception of the stop-plate 2. This is so constructed as to make a snug fit and, when forced into this slot, the stop-plate and member 15 become an integral structure, the lower portion of the member 15 being in true right angular relation to the inner surface of the base-plate 1.

The member 15 is provided with an opening 16 extending centrally therethrough to constitute a housing and permit free movement therein of the extended portions of the arms 9 when assembled as shown in Fig. 3. This instrumentality also carries means for retaining a dressing instrumentality, and as here shown there is threaded into openings in the member 15 a screw 17 operated by a knurled knob and having at its outer portion threaded engagement with a file or dresser-retaining member 18. This member carries a shoulder between which and the under surface of the member 15 a file or the like 19 may be confined.

The member 15 may be moved relatively to the base-plate 1 and stop-plate 2 which makes it useful in connection with jointing operations and also dressing. For the purpose of dressing down the top of the teeth to a certain level the entire device may be moved across the teeth when in position shown in Fig. 3. When the member 15 is removed, the screw 8 may be operated to adjust the bent portion of the gauge-arms 9 to any height or width of tooth, and an accurate gaging thereof accomplished. The grooves in the arms serve a double purpose, assisting in retaining the device in position, leaving both hands free, as well as gaging the width of the teeth.

While the invention has been described in connection with the embodiment herein shown, it will be understood that I do not wish to limit myself to the precise form of the present disclosure, as many changes in the general structure and arrangement of parts are contemplated as within the scope of the invention as set forth in the claims.

What I claim is:

1. A saw tooth dressing mechanism comprising a plate; a gauge-arm support operatively associated with the plate; cooperating gauge-arms operatively associated with the support, one portion of an arm having a swinging movement in relation to the support and an instrumentality for moving the gauge-arm support with relation to the plate, operatively associated with the support and plate.

2. A saw tooth dressing mechanism comprising a plate; a gauge-arm support adjustably mounted on the plate; a gauge-arm pivotally mounted on the support; and means for swinging the gauge-arm on its pivot, operatively connected with the arm.

3. A saw tooth dressing mechanism comprising a plate; a gauge-arm support adjustably mounted on the plate; a gauge-arm pivotally mounted on the support; means for swinging the gauge-arm on its pivot, operatively connected with the arm; and means yieldingly holding the gauge-arm against movement by the arm-swinging means.

4. A saw tooth dressing mechanism comprising a plate; a gauge-arm support adjustably mounted on the plate; a gauge-arm pivotally mounted on the support; means for swinging the gauge-arm on its pivot, operatively connected with the arm; and means yieldingly holding the gauge-arm against movement by the arm-swinging means, said means including a resilient member normally pressing the gauge-arm in one direction.

5. A saw tooth dressing mechanism comprising a back plate, a stop plate arranged at an angle thereto and provided with a tooth-receiving opening; a gauge-arm support adjustably mounted on one of the plates; a gauge-arm pivotally mounted at one end on the support, the other end of the arm extending into proximity to the tooth opening in the stop plate; and means for swinging the gauge-arm on its pivot.

6. A device of the character described including a base-plate, a stop-plate arranged therein in angular relation to the base-plate, each of said plates being provided with a cut-away portion, a gauge-arm bearing member mounted on said base-plate, a gauge-arm pivotally mounted for swinging movement on the bearing and having a portion of the arm extending into the cut-away portions of the plates, means for actuating the gauge-arm on its pivot, and means for adjusting the bearing with relation to the arm-moving means.

7. A device of the character described including a base-plate, a stop-plate arranged therein in angular relation to the base-plate, both of said plates being provided with a cut-away portion, a gauge-arm bearing member mounted on said base-plate, a gauge-arm pivotally mounted on the bearing and having a portion of the arm extending into the cut-away portions of the plates, means for actuating the gauge-arm on its pivot, and means for adjusting the bearing with relation to the arm-moving means, such means comprising an adjusting instrumentality mounted on one of the plates and in operative engagement with the bearing.

8. A saw tooth dressing mechanism comprising a back plate, a stop plate arranged at an angle thereto and provided with a tooth-receiving opening; a gauge-arm support adjustably mounted on one of the plates; a gauge-arm pivotally mounted at one end on the support, the other end of the arm extending into proximity to the tooth opening in the stop plate; and means for swinging the gauge-arm on its pivot; said arm having a portion extended angularly therefrom and having a tooth-engaging portion thereon.

9. A device of the character described including a base-plate; a stop-plate mounted thereon in angular relation to the base-plate, a bearing member, having spaced-apart arms, slidably mounted on the base-plate, an adjusting member mounted on one of the plates and connected with the bearing-member, a plurality of spaced-apart gauge-arms pivotally mounted on the bearing-member at one end, their outer ends being bent at an angle to the arms into approximately the plane of the lower surface of the stop-plate, spring-members normally pressing the arms together, a cam-member restricting the movement of the arms in one direction, and means for actuating the cam to spread the arms.

10. A device of the character described including a base-plate, a stop-plate mounted thereon in angular relation to the base-plate, a bearing member, having spaced-apart arms, slidably mounted on the base-plate, an adjusting member mounted on one of the plates and connected with the bearing-member, a plurality of spaced-apart gauge-arms pivotally mounted on the bearing-member at one end, their outer ends being bent at an angle to the arms into approximately the plane of the lower surface of the stop-plate, spring-members normally pressing the arms together, a cam-member restricting the movement of the arms in one direction, and means for actuating the cam to spread the arms, said arms being provided on opposite surfaces thereof with a tooth-receiving groove in approximately the plane of the inner face of the base-plate.

11. A saw tooth dressing mechanism including a back plate; a stop plate arranged at an angle thereto and provided with a tooth opening therein; a gauge-arm adjustably mounted for movement on one of the plates; a plurality of gauge-arms pivotally mounted on the support at one end, the free end of each arm extending into proximity to the tooth opening in the stop plate; resilient means yieldingly holding the gauge-arms in one position; and means for moving the arms against the resistance of the resilient means.

12. A saw tooth dressing mechanism including a back plate; a stop plate arranged at an angle thereto and provided with a tooth opening therein; a gauge-arm adjustably mounted for movement on one of the plates; a plurality of gauge-arms pivotally mounted on the support at one end, the free end of each arm extending into proximity to the tooth opening in the stop plate; resilient means yieldingly holding the gauge-arms in one position; means for moving the arms against the resistance of the resilient means, said means including a cam mounted in operative position with relation to the gauge-arms; and means for actuating the cam to move the arms.

13. A saw tooth dresser and gauge including a support; a gauge-arm pivotally mounted for swinging movement on the support; an arm-actuating instrumentality in fixed relation to the support; and means for bodily moving the support with relation to the arm-actuating instrumentality, whereby the sweep of a portion of the arm is varied.

14. A saw tooth dresser and gauge including a support; a gauge-arm pivotally mounted for swinging movement on the support; an arm-actuating instrumentality in fixed relation to the support; means for bodily moving the support with relation to the arm-actuating instrumentality, whereby the sweep of a portion of the arm is varied; and means yieldingly resisting the movement of the arm by the actuating instrumentality.

15. A saw dressing instrumentality comprising a back plate; a stop plate arranged at an angle to the back plate and provided with a tooth opening therein; an adjusting member mounted on the back plate; a gauge-arm support movably mounted on the back plate and connected with the adjusting member; gauge-arms, in spaced relation, pivotally mounted on the gauge-arm support, the free ends of the arms extending into proximity to the tooth opening and having a portion of each arm adapted to contact a saw tooth between the arms; means for spreading the gauge-arms, including a cam mounted movably between the arms; and means including a resilient member yieldingly holding each gauge-arm against movement by the cam.

16. A saw dressing instrumentality comprising a back plate; a stop plate arranged at an angle to the back plate and provided with a tooth opening therein; an adjusting member mounted on the back plate; a gauge-arm support movably mounted on the back plate and connected with the adjusting member; gauge-arms, in spaced relation, pivotally mounted on the gauge-arm support, the free ends of the arms extending into proximity to the tooth opening and having a portion of each arm adapted to contact a saw tooth between the arms; means for spreading the gauge-arms, including a cam mounted movably between the arms; means including a resilient member yieldingly holding each gauge-arm against movement by the cam; and means for locking the movable gauge-arm support in adjusted position.

17. In a saw dressing instrumentality, a plate; a gauge-arm support movably mounted thereon; a gauge-arm pivotally mounted on the support; means for actuating the gauge-arm associated with the arm and support; and means for moving the gauge-arm support with relation to the actuating means, whereby a given movement of the actuating means will produce a variation in the sweep of the free end of the gauge-arm, depending upon the relation of the gauge-arm pivot to the actuating means.

In testimony whereof I affix my signature in presence of two witnesses.

MICHAEL DALLENBACH.

Witnesses:
THOS. H. LEDDEN,
FRED M. FARLIN.